(12) United States Patent
Van Den Bossche

(10) Patent No.: US 6,748,796 B1
(45) Date of Patent: Jun. 15, 2004

(54) PROCEDURE FOR DETERMINING THE DYNAMIC BEHAVIOR OF A VEHICLE ON A TEST BENCH

(75) Inventor: Alex Van Den Bossche, Walshoutem (BE)

(73) Assignee: Krypton Electronic Engineering N.V., Leuven (BE)

( * ) Notice: Subject to any disclaimer, the term of this patent is extended or adjusted under 35 U.S.C. 154(b) by 49 days.

(21) Appl. No.: 10/130,717
(22) PCT Filed: Nov. 24, 2000
(86) PCT No.: PCT/BE00/00139
§ 371 (c)(1),
(2), (4) Date: May 23, 2002
(87) PCT Pub. No.: WO01/38843
PCT Pub. Date: May 31, 2001

(30) Foreign Application Priority Data

Nov. 24, 1999 (BE) ................................ 9900765

(51) Int. Cl.⁷ ................................................ G01M 15/00
(52) U.S. Cl. ........................................ 73/118.1; 33/288
(58) Field of Search ............................ 73/11.05, 11.04, 73/11.07, 11.08, 11.09, 118.1; 340/438, 442, 443; 33/286, 288, 335, 336, 337

(56) References Cited

U.S. PATENT DOCUMENTS

| 4,899,218 | A |   | 2/1990 | Waldecker et al. |
| 5,140,533 | A |   | 8/1992 | Celette |
| 5,535,522 | A | * | 7/1996 | Jackson ........................ 33/288 |
| 6,341,013 | B1 | * | 1/2002 | Battiti et al. ........... 356/139.09 |
| 6,572,248 | B2 | * | 6/2003 | Okuchi et al. ............... 362/464 |
| 2002/0080343 | A1 | * | 6/2002 | Bux et al. ............... 356/139.09 |
| 2003/0051356 | A1 | * | 3/2003 | Jackson et al. ............... 33/293 |
| 2003/0147068 | A1 | * | 8/2003 | Corghi ................... 356/139.09 |

FOREIGN PATENT DOCUMENTS

| DE | 4212426 | 7/1993 |
| DE | 19757760 | 7/1999 |
| DE | 19757763 | 7/1999 |
| DE | 19823367 | 11/1999 |
| EP | 0390710 | 10/1990 |
| EP | 0803703 | 10/1997 |
| WO | WO 0107862 | 2/2001 |

OTHER PUBLICATIONS

Abstract of JP–09133510 published May 20, 1997.

* cited by examiner

*Primary Examiner*—Eric S. McCall
(74) *Attorney, Agent, or Firm*—Browdy and Neimark, P.L.L.C.

(57) ABSTRACT

A method for measuring the displacement of a vehicle wheel relative to the frame thereof or relative to a fixed point of reference. The vehicle is located on a test stand in which the wheel is loaded, statically or dynamically. In a first step, a measuring system including cameras measures the position of at least three points of reference on the wheel, these three points of reference not being in a straight line. In a second step, the relative displacement of the wheel is calculated.

32 Claims, 2 Drawing Sheets

PROCEDURE FOR DETERMINING THE DYNAMIC BEHAVIOR OF A VEHICLE ON A TEST BENCH

FIELD OF THE INVENTION

The invention relates to a method for measuring the displacement of a wheel of a vehicle relative to the frame thereof or relative to a fixed point of reference, when this vehicle is located on a test stand, in which the vehicle, preferably via the said wheel is loaded, statically or dynamically.

BACKGROUND OF THE INVENTION

According to the present state of the art, such measurements are taken using linear inductive wheel motion recorders, laser projection sensors or milometers on the basis of unwinding reels of cord in conjunction with a rotary encoder.

All these commonly-used measuring systems and the test methods have the drawback that only a limited excitation of the wheel can be measured. Hence, on account of the technical features of the existing measuring systems, only a maximum rotation or inclination of the wheel in the region of 20 degrees can be measured. In addition, these existing systems are no good for taking measurements if and when the wheel is loaded at a frequency which is higher than 10 Hz or if this wheel is subjected to large excitations.

These existing test set-ups are extremely complex in their design, hard to calibrate and it is, on top of that, very laborious to build in additional points of reference on the frame.

SUMMARY OF THE INVENTION

The aim of the method, according to the invention, is to remove these drawbacks and to propose a method which allows measurements to be taken at very high frequencies and with very large displacements of the wheel relative to the frame. With this method it is also possible to measure very large rotations or inclinations of the wheel.

In addition the method, according to the invention, offers the added advantage that, in a straightforward way, a high number of extra points of reference can be incorporated in the frame. These points of reference can be depicted in a shared system of coordinates relative to one and the same coordinate system.

To this aim, in the method according to the invention, in a first step, the position of at least three, not lying in a straight line, points of reference on the said wheel are measured by means of a measuring system which, preferably, comprises linear cameras or matrix cameras, in which subsequently, in a second step, the said relative displacement is calculated.

To this end, prior to the first step, the said wheel is subjected to a revolution about the axis of rotation thereof while successive positions of at least one of the points of reference are measured on the thus, through the point of reference under consideration, traced arc, in which, on the one hand, a plane is defined which is parallel to this arc and, on the other hand, the centre of the circle on which the arc lies and which lies on the said axis of rotation is calculated, so as to determine a coordinate system whose first axis coincides with the axis of rotation and a second and third axis lie in the said plane.

In a preferred embodiment of the method, according to the invention, the said coordinate system is displaced along the direction of the axis of rotation over a known distance such that the said plane coincides with the median transverse vertical plane of the wheel.

According to a special embodiment of the method, according to the invention, the position of the points of reference of several wheels of the said vehicle in a state of rest is determined relative to one another such that the positions of these points of reference can be expressed in terms of one and the same coordinate system.

Other peculiarities and advantages of the invention will soon become apparent from the following description of a specific embodiment of the method and the configuration according to the invention; this description is only given as an example and does not limit the scope of the protection that is being claimed; the reference numbers used hereinafter bear upon the figures appended hereto.

BRIEF DESCRIPTION OF THE DRAWINGS

FIG. 3 is a schematic representation of the wheel out of FIG. 2 viewed end-on.

In the various figures, the same reference numbers bear upon the same or analogous elements.

In the method, according to the invention, a vehicle, e.g. a car, of which, for example, the wheel suspension is to be tested, is set upon a test stand. This test stand is equipped with actuators which mean that at least one wheel of the vehicle can be exited such that the wheel is subjected to a translatory movement and/or a rotation.

Figure 1:
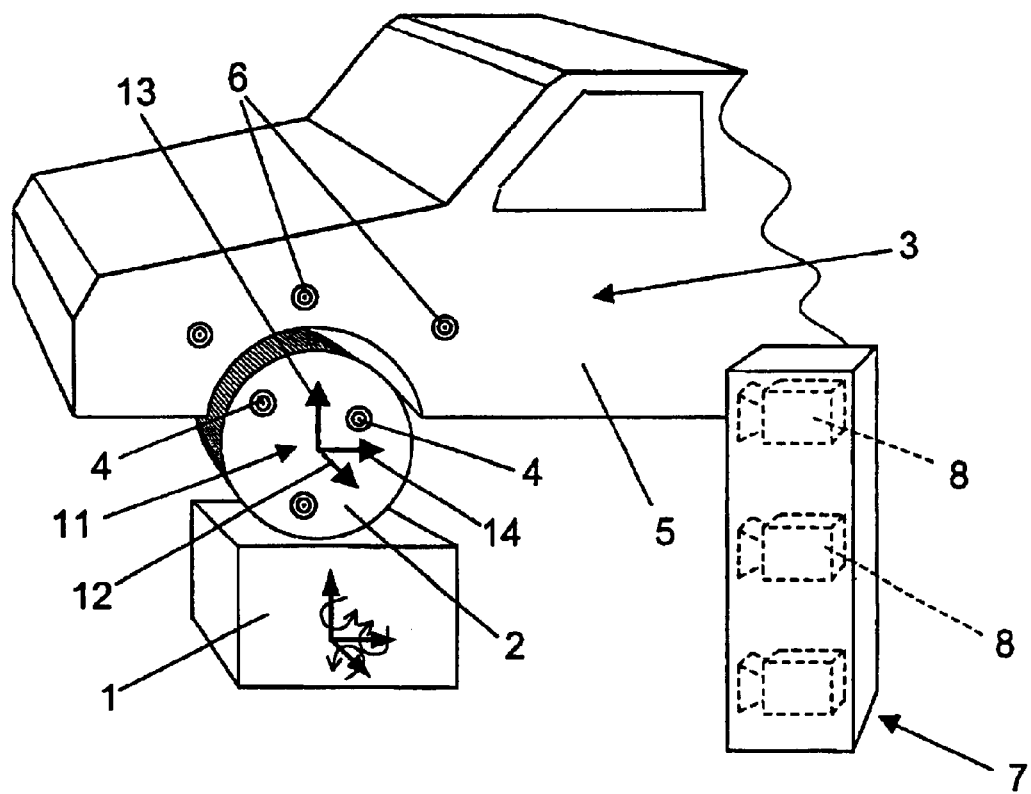
FIG. 1 is a schematic perspective drawing of part of a test stand showing part of a vehicle.

Represented schematically, in FIG. 1, is such an actuator 1 on which a wheel 2 rests of a vehicle 3.

In the method, according to the invention, three points of reference 4 and fitted to the side surface of the wheel 2. These points of reference 4 consist of light-emitting diodes (LEDs). Also mounted on the frame 5 of the vehicle 3 are three points of reference 6 each of which, like before, consists of a light-emitting diode (LED).

DETAILED DESCRIPTION OF THE INVENTION

After that, the said actuator 1 is activated and a specified excitation is imposed on the wheel 2.

In order to determine the displacement of the wheel 2 relative to the frame 5 of the vehicle 3, are measured, in a first step, using a measuring system 7, which comprises three linear cameras 8, the position of the points of reference 4 of the wheel 2 and the points of reference 6 of the frame 5.

The use of a measuring system 7 with linear cameras 8 means that the position of the points of reference 4 and 6 can be measured at very high speed and with great precision, such that measurements can be carried out for excitations of the wheel 2 at frequencies up to 500 Hz. These linear cameras 8 make it, for instance, possible to operate at 3,000 measurements per second.

Such a high-frequency measuring system is, in itself, well-known and an analogous measuring system was set down in the Belgian patent application No. 09700143.

Starting from each position thus measured for the three points of reference 4 of the wheel 2 and for the three points of reference 6 of the frame 5 is then calculated, in a second step, the displacement of the wheel 2 relative to the frame 5 using already well-documented trigonometry.

In an alternative embodiment of the method, according to the invention, the displacement of the wheels 2 and the frame 5 are determined relative to a fixed point of reference, for example the test stand itself.

In a preferred embodiment of the method, according to the invention, is set up, prior to the above-mentioned first step, a coordinate system which is fixed with respect to the wheel 2, whose displacement relative to the frame 5 is to be determined.

Firstly, to that end, a plane is determined which is perpendicular to the axis of rotation of the wheel 2 in question and, after that, a centre of rotation of this axis of rotation is calculated. In this way the axis of rotation itself of the wheel 2 can be calculated exactly as this axis is at right angles to the said plane and runs through the centre of rotation.

In a first variant on the method are measured, for the determination of this plane, by means of the measuring system, the position of each of the three points of reference 4 of the wheel 2. The plane is then determined which contains these three points of reference 4.

The points of reference 4 are measured, preferably, by means of a set-up and method as outlined in the Belgian patent application No. 9700366.

Figure 2:
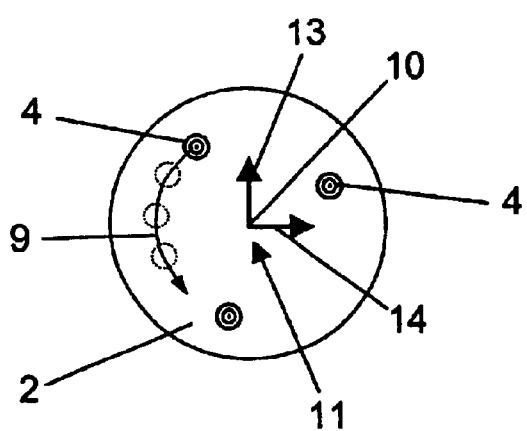
FIG. 2 is a schematic representation of a wheel with three points of references in side elevation.

In a second variant on the method, the position of the said plane is determined by subjecting the wheel 2 to a revolution about the axis of rotation thereof and passing through 180 degrees, as shown schematically in FIG. 2. During this rotary motion, successive positions are measured of at least one point of reference 4. These measured positions all lie along an arc 9. Finally, the plane is determined that contains this arc 9.

Also, in order to determine the correct position of the said centre of rotation, the centre 10 of the circle on which the arc 9 lies, is calculated. As a consequence, the said centre of rotation coincides with this centre 10.

Next, a coordinate system 11 is defined whose first axis 12 is perpendicular to the said plane and which contains the said centre of rotation so that this axis 12 coincides with the axis of rotation of the wheel 2. A second and third axis 13 and 14 of this coordinate system 11 are perpendicular to each other and, together, from the said plane that was determined according to one of the variant versions as described above.

Figure 3:
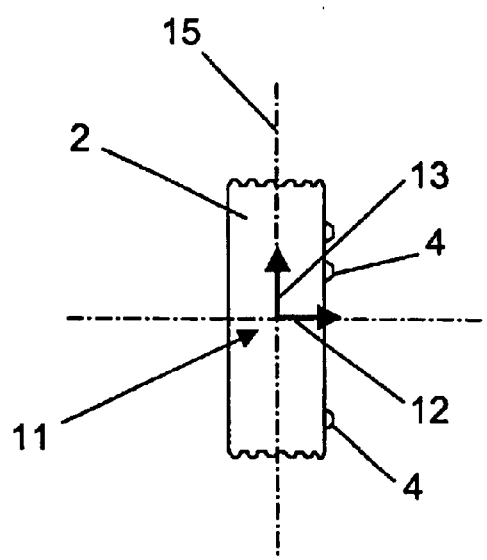
Figure 4:
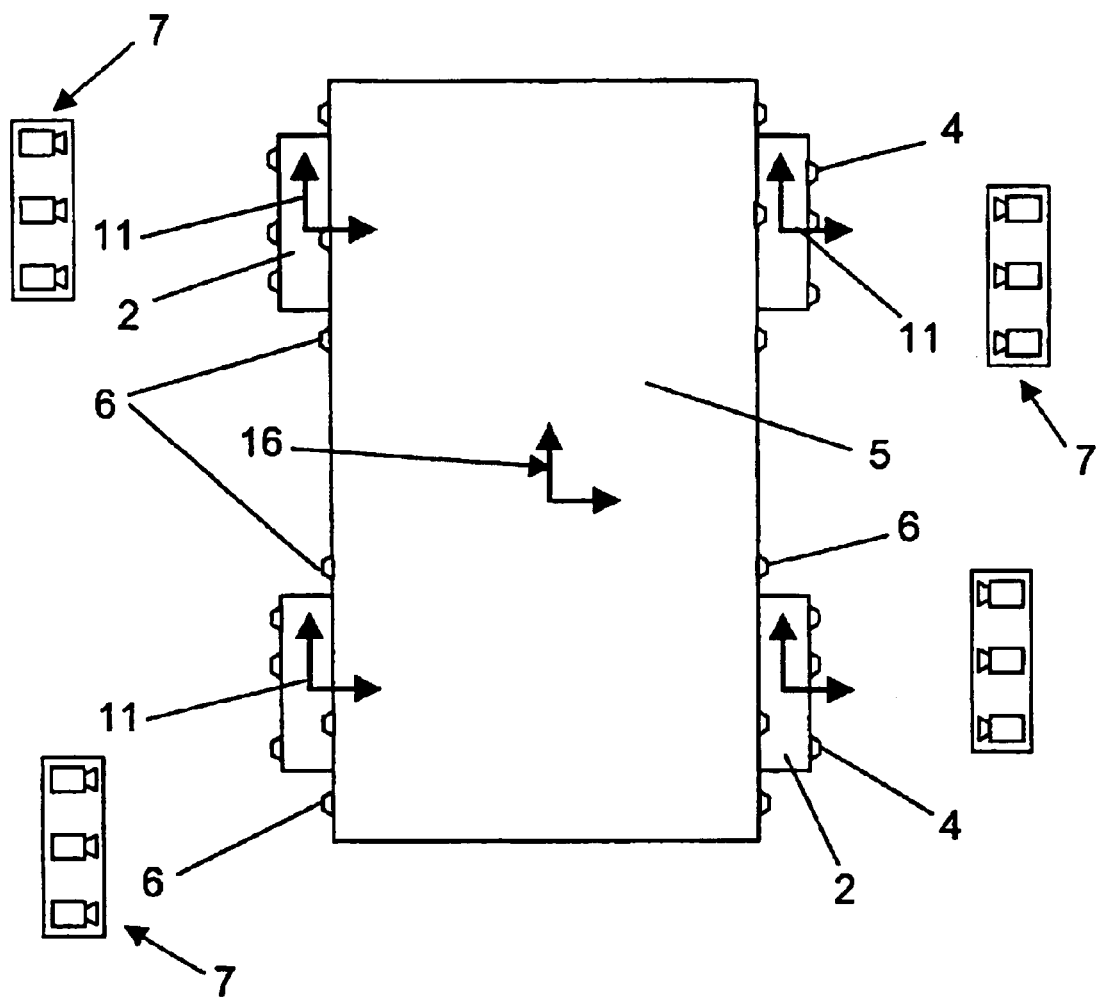
FIG. 4 is a schematic top view of a test stand with a vehicle on it.

According to a special preferred embodiment of the method, according to the invention, the said coordinate system 11 is then moved through a known distance according to the axis of rotation of the wheel 2, such that the said second and third axes 13 and 14 constitute the medium transverse vertical plane 15 of the wheel 2, as shown in FIG. 3.

If the point of reference 4 of the wheel 2 is mounted on the side surface thereof, the coordinate system 11 should, as a consequence, be moved, through a distance which is equal to the half the thickness of the wheel 2.

As and when the said actuator 1 excites the wheel 2, are measured, almost continuously, the position of the points of reference 4 of the wheel 2 and the points of reference 6 of the frame 5 by the measuring system 7. Based on the unequivocal relationship that exists between the position of the points of reference 4 of the wheel 2 and those of the coordinate system 11, is calculated the corresponding position of the latter. In that way the correct position of the wheel 2 relative to the frame 5 is known.

Besides the calculation of translatory displacements of the wheel 2 relative to the frame, this method can be also be used to determine the orientation and rotation of the wheel 2 relative to the stationary position or relative to the frame 5. By using, for the points of reference 4, light-emitting diodes that produce a wide-angled beam of light, or by using more than three points of reference, very large excitations of the wheel 2 can be measured. It is possible, therefore, to measure a rotation or an inclination of the wheel 2 for angles which, for example, can range between 60 and 360 degrees for the three axes of the coordinate system 11. Displacements relative to these axes can also be measured in the order of several dozens of centimeters.

In another embodiment of the method, to which the invention pertains, the position of the points of reference 4 of several wheels 2 of the said vehicle 3 in a state of rest relative to one another is measured as is the relative position of the points of reference 4 of the frame.

Provision is also made for a central coordinate system 16 that is reciprocating with respect to the frame 5 of the vehicle 3 and which lies, for example, in the centre of gravity thereof. As a consequence, any deformation of the frame 5 of the vehicle 3 is determined by measuring the position of the various points of reference 4 of this frame 5 in the vicinity of the wheels 2 and by calculating the displacement thereof relative to this central coordinate system 16 as and when these wheels are excited by the actuators 1.

In a specific embodiment of the method, to which the invention pertains, the position of the respective coordinate systems for the wheels 2 is expressed in relative to the said central coordinate system 16. Next, according to this embodiment of the method, the relative displacement of the respective wheels 2, is, whenever these wheels are excited, calculated, so as to study the dynamic behaviour of the wheels 2 relative to one another. Any movements of the wheels 2 can, like that, be measured relative to one another.

The invention is, of course, not limited to the method as described above. For example, more than three points of reference could be incorporated and measured at each wheel 2. In addition, these points of reference 4 and 6 could, for example, consist of all manner of light sources such as, among other things, infrared LEDs. If desired, the points of reference 4 and 6 could consist of a colour-coded marking, markers or, alternatively, an arbitrary identifying mark on a wheel or one the frame is used as a point of reference.

If desired, still further points of reference could be added, during the measurement itself, on the wheel or on the frame. To that end, an additional point of reference is fitted to the wheel or to the frame and the position of this extra point of reference is measured and expressed relative to the position of the other points of reference or relative to a shared system of coordinates.

In addition to that, the said measuring system could also comprise more than three cameras and these could be, for example, linear cameras, matrix cameras or addressable cameras.

What is claimed is:

1. A method for measuring displacement of a wheel of a vehicle relative to the frame of the vehicle, or relative to a fixed point of reference when the vehicle is located on a test stand in which the vehicle is loaded, statically or dynamically, comprising:

a. measuring each position of each of three points of reference on the wheel, said points of reference not lying in a straight line, by means of a measuring system comprising cameras;

b. measuring positions of three points of reference provided on the frame; and c. calculating the displacement of the wheel relative to the frame.

2. The method according to claim 1 wherein, prior to step (a), the wheel is revolved about the axis of rotation of the wheel, while successive positions of at least one of the points of reference on the wheel are measured on a traced arc through the point of reference under consideration in which a plane is defined which is parallel to the arc and wherein the center of the circle on which the arc lies on which lies on the axis of rotation is calculated, so as to determine a coordinate system, the first axis of which coincides the with axis of rotation and a second and a third axis lie in the said plane.

3. The method according to claim 2 wherein the coordinate system is displaced along the direction of the axis of rotation over a known distance such that the plane coincides with the median transverse vertical plane of the wheel.

4. The method according to claim 2 wherein the position of the points of reference of several wheels of the vehicle in a state of rest is determined relative to one another such that these points of reference can be expressed in terms of the same coordinate system.

5. The method according to claim 3 wherein the position of the points of reference of several wheels of the vehicle in a state of rest is determined relative to one another such that these points of reference can be expressed in terms of the same coordinate system.

6. The method according to claim 1 wherein the position of at least three points of reference of the frame is measured, in which the relative position of the points of reference of the wheel relative to the points of reference of the frame is calculated, such that the exact position of the wheel is known relative to the frame.

7. The method according to claim 2 wherein the position of at least three points of reference of the frame is measured, in which the relative position of the points of reference of the wheel relative to the points of reference of the frame is calculated, such that the exact position of the wheel is known relative to the frame.

8. The method according to claim 3 wherein the position of at least three points of reference of the frame is measured, in which the relative position of the points of reference of the wheel relative to the points of reference of the frame is calculated, such that the exact position of the wheel is known relative to the frame.

9. The method according to claim 4 wherein the positions of at least three points of reference of the frame is measured, in which the relative position of the points of reference of the wheel relative to the points of reference of the frame is calculated, such that the exact position of the wheel is known relative to the frame.

10. The method according to claim 1 wherein the wheel is loaded at a frequency between 10 Hz and 500 Hz.

11. The method according to claim 2 wherein the wheel is loaded at a frequency between 10 Hz and 500 Hz.

12. The method according to claim 3 wherein the wheel is loaded at a frequency between 10 Hz and 500 Hz.

13. The method according to claim 4 wherein the wheel is loaded at a frequency between 10 Hz and 500 Hz.

14. The method according to claim 6, wherein the wheel is loaded at a frequency between 10 Hz and 500 Hz.

15. The method according to claim 1 wherein linear cameras are used in the measuring system.

16. The method according to claim 2 wherein linear cameras are used in the measuring system.

17. The method according to claim 3 wherein linear cameras are used in the measuring system.

18. The method according to claim 4 wherein linear cameras are used in the measuring system.

19. The method according to claim 5 wherein linear cameras are used in the measuring system.

20. The method according to claim 6 wherein linear cameras are used in the measuring system.

21. The method according to claim 1 wherein infrared diodes are used for the point of reference.

22. The method according to claim 2 wherein infrared diodes are used for the point of reference.

23. The method according to claim 3 wherein infrared diodes are used for the point of reference.

24. The method according to claim 4 wherein infrared diodes are used for the point of reference.

25. The method according to claim 5 wherein infrared diodes are used for the point of reference.

26. The method according to claim 1 wherein infrared diodes are used for the point of reference.

27. The method according to claim 2 wherein infrared diodes are used for the point of reference.

28. The method according to claim 2 wherein infrared diodes are used for the point of reference.

29. The method according to claim 4 wherein infrared diodes are used for the point of reference.

30. The method according to claim 6 wherein infrared diodes are used for the point of reference.

31. The method according to claim 10 wherein infrared diodes are used for the point of reference.

32. The method according to claim 15 wherein infrared diodes are used for the point of reference.

\* \* \* \* \*